United States Patent
Koberstein et al.

(10) Patent No.: US 12,109,866 B2
(45) Date of Patent: Oct. 8, 2024

(54) THERMAL MANAGEMENT SYSTEM FOR A VEHICLE

(71) Applicant: Ford Global Technologies, LLC, Dearborn, MI (US)

(72) Inventors: Manfred Koberstein, Troy, MI (US); Chris Robert Sculthorpe, Canton, MI (US); Craig Martin Spinneweber, Fenton, MI (US); John Azar, LaSalle (CA); Michael M. Azzouz, Farmington, MI (US); Scott Nydam, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/949,468

(22) Filed: Sep. 21, 2022

(65) Prior Publication Data

US 2024/0092137 A1  Mar. 21, 2024

(51) Int. Cl.
*B60H 1/00* (2006.01)

(52) U.S. Cl.
CPC ..... *B60H 1/00028* (2013.01); *B60H 1/00492* (2013.01); *B60H 1/00592* (2013.01); *B60H 1/00821* (2013.01); *B60H 2001/00214* (2013.01); *B60H 2001/003* (2013.01)

(58) Field of Classification Search
CPC ............ B60H 1/00492; B60H 1/00592; B60H 1/00485; B60H 1/00835; B60H 1/00821; B60R 5/02; B60N 3/104; A45C 2200/20; A45C 11/20; A45C 2009/005; A47J 47/02; A47J 47/14; A47J 41/00
See application file for complete search history.

(56) References Cited

U.S. PATENT DOCUMENTS

| | | | | | |
|---|---|---|---|---|---|
| 2,902,838 | A | * | 9/1959 | Nichols | B60N 3/104 62/337 |
| 3,410,337 | A | * | 11/1968 | Priest | F25D 15/00 165/47 |
| 3,757,851 | A | * | 9/1973 | Marble | B60N 3/16 165/41 |
| 3,850,006 | A | * | 11/1974 | Redfern | F25D 3/005 62/298 |
| 3,858,405 | A | * | 1/1975 | Manzke | F25B 5/02 62/243 |
| 4,103,510 | A | * | 8/1978 | Hall | F25D 15/00 62/457.2 |
| 4,545,211 | A | * | 10/1985 | Gaus | B60H 1/00592 62/115 |

(Continued)

FOREIGN PATENT DOCUMENTS

| | | | | |
|---|---|---|---|---|
| CA | 2629665 A1 | * | 10/2009 | ............... B65F 1/08 |
| CN | 102320257 A | | 1/2012 | |

(Continued)

*Primary Examiner* — Jenna M Maroney
(74) *Attorney, Agent, or Firm* — Vichit Chea; Price Heneveld LLP

(57) ABSTRACT

A thermal management system for a vehicle includes a heat exchange unit coupled with a compartment of the vehicle via an interface in the compartment. A container is moveable between a first position and a second position. The container is configured to be in fluid communication with the heat exchange unit via the interface in the first position.

18 Claims, 4 Drawing Sheets

(56) References Cited

U.S. PATENT DOCUMENTS

| | | | | |
|---|---|---|---|---|
| 4,637,222 | A * | 1/1987 | Fujiwara | F25D 16/00 |
| | | | | 62/298 |
| 4,927,044 | A * | 5/1990 | Gotoh | C08G 18/482 |
| | | | | 220/675 |
| 4,936,103 | A * | 6/1990 | Newman | B60H 1/00592 |
| | | | | 211/186 |
| 5,181,555 | A * | 1/1993 | Chruniak | B60N 3/104 |
| | | | | 165/41 |
| 5,203,833 | A * | 4/1993 | Howell | B60H 1/00592 |
| | | | | 165/41 |
| 5,588,480 | A * | 12/1996 | Armanno, Sr. | B60H 1/00271 |
| | | | | 165/41 |
| 5,701,754 | A * | 12/1997 | Choi | B60H 1/00592 |
| | | | | 62/244 |
| 5,927,091 | A * | 7/1999 | Hong | F25D 31/006 |
| | | | | 62/239 |
| 6,092,381 | A * | 7/2000 | Hsiao | B60H 1/00264 |
| | | | | 62/434 |
| 6,474,715 | B2 * | 11/2002 | Fukushima | B60R 5/04 |
| | | | | 296/37.2 |
| 6,973,799 | B2 * | 12/2005 | Kuehl | B60H 1/32281 |
| | | | | 62/434 |
| 7,007,494 | B2 * | 3/2006 | Al Rashidi | A47J 47/14 |
| | | | | 165/41 |
| 7,389,650 | B2 * | 6/2008 | Kukucka | B60N 3/104 |
| | | | | 62/457.3 |
| 7,591,498 | B2 * | 9/2009 | Busha | B60N 3/101 |
| | | | | 224/281 |
| 7,762,601 | B2 * | 7/2010 | Shea | B60R 11/06 |
| | | | | 296/37.16 |
| 8,196,648 | B2 * | 6/2012 | Matsukawa | B60N 3/104 |
| | | | | 62/3.61 |
| 10,202,069 | B2 * | 2/2019 | Salter | B60N 3/104 |
| 10,562,456 | B2 * | 2/2020 | Lynch | B60R 3/02 |
| 10,723,390 | B2 * | 7/2020 | Salter | B62D 25/105 |
| 10,730,400 | B2 * | 8/2020 | Salter | B60L 53/18 |
| 10,730,441 | B2 * | 8/2020 | Glickman | B62D 25/084 |
| 10,953,721 | B2 | 3/2021 | Gruber | |
| 10,953,783 | B2 * | 3/2021 | Qiu | B60R 25/20 |
| 11,148,602 | B2 | 10/2021 | Ahlning | |
| 11,214,185 | B2 * | 1/2022 | Qiu | B60N 3/104 |
| 11,897,424 | B2 * | 2/2024 | Gill | B62D 25/087 |
| 2004/0139757 | A1 * | 7/2004 | Kuehl | F25D 17/02 |
| | | | | 62/434 |
| 2007/0187969 | A1 * | 8/2007 | Dowd | B60R 7/02 |
| | | | | 296/37.1 |
| 2010/0052353 | A1 * | 3/2010 | Shea | B60R 11/06 |
| | | | | 296/37.16 |
| 2011/0031771 | A1 * | 2/2011 | Ding | B60R 5/02 |
| | | | | 296/76 |
| 2018/0037150 | A1 * | 2/2018 | Rotharmel | B60N 3/10 |
| 2018/0072254 | A1 * | 3/2018 | Wymore | B60R 11/06 |
| 2019/0118692 | A1 * | 4/2019 | Qiu | B60L 50/50 |
| 2019/0122325 | A1 * | 4/2019 | Qiu | H04W 4/44 |
| 2020/0108688 | A1 * | 4/2020 | Gruber | H01M 10/656 |
| 2020/0223683 | A1 * | 7/2020 | Subramanya | B67D 1/0888 |
| 2023/0288265 | A1 * | 9/2023 | Simms | F25D 29/00 |

FOREIGN PATENT DOCUMENTS

| | | | | |
|---|---|---|---|---|
| CN | 108944620 | A * | 12/2018 | |
| CN | 114061222 | A * | 2/2022 | |
| DE | 10212222 | A1 * | 10/2003 | B60P 7/0815 |
| DE | 102012204160 | A1 | 9/2013 | |
| DE | 102016203084 | A1 | 9/2017 | |
| DE | 102020135071 | A1 | 7/2021 | |
| DE | 102020106560 | A1 * | 9/2021 | |
| DE | 102021110530 | A1 * | 10/2022 | |
| EP | 1291594 | A2 * | 3/2003 | F17C 13/026 |
| EP | 3075583 | A2 * | 10/2016 | B60H 1/00271 |
| FR | 3047453 | A1 * | 8/2017 | |
| KR | 19980039564 | U * | 9/1998 | |
| KR | 20090121601 | A * | 11/2009 | |
| WO | WO-8802705 | A1 * | 4/1988 | |
| WO | 2021245557 | A1 | 12/2021 | |

* cited by examiner

THERMAL MANAGEMENT SYSTEM FOR A VEHICLE

FIELD OF THE DISCLOSURE

The present disclosure generally relates to a thermal management system for a vehicle and, more particularly, relates to a climate-controlled compartment and movable container in a vehicle.

BACKGROUND OF THE DISCLOSURE

Compartments for vehicles can be climate-controlled. For example, some compartments may be configured for heating or cooling items in the compartment. Alternatively, a climate-controlled case may be disposed in a dedicated location in the vehicle. However, conventional climate-controlled cases and designated vehicle compartments do not interact with one another to allow the climate-controlled case to couple with an on-board heating/cooling device that is configured to heat or cool the compartment and/or the case. A need is presented for a dynamic system that can heat or cool the compartment and/or the case by a common interface or climate control system.

SUMMARY OF THE DISCLOSURE

According to a first aspect of the present disclosure, a thermal management system for a vehicle includes a heat exchange unit coupled with a compartment of the vehicle via an interface in the compartment. A container is moveable between a first position and a second position. The container is configured to be in fluid communication with the heat exchange unit via the interface in the first position.

Embodiments of the first aspect of the disclosure can include any one or a combination of the following features:
- the thermal management system includes an attachment arrangement including a locking member biasing the container toward the first position when the container is in the first position;
- the thermal management system wherein the attachment arrangement further includes a first mating member coupled to a wall of the compartment and a second mating member disposed on an exterior surface of the container for engaging the first mating member in the first position;
- the thermal management system wherein the first mating member includes an alignment mechanism and the second mating member includes a groove for receiving the alignment mechanism in the first position;
- the thermal management system wherein the first mating member extends from a floor of the compartment and the second mating member extends into a lower portion of the container;
- the thermal management system includes at least one conduit extending between the heat exchange unit and the interface for supplying air to or withdrawing air from the container in the first position and the compartment in the second position;
- the thermal management system wherein the at least one conduit includes a first conduit for supplying air to and a second conduit for withdrawing air from at least one of the container and the compartment;
- the thermal management system includes a valve for selectively providing the fluid communication between the heat exchange unit and the container;
- the thermal management system includes a user interface and a controller, the controller being in communication with the valve and the user interface and configured to control the valve based on a user input to the interface;
- the thermal management system wherein the container is engaged with the compartment in the first position and released from the compartment in the second position;
- the thermal management system wherein the compartment is a front trunk of the vehicle;
- the thermal management system wherein the heat exchange unit is configured to heat and cool the container in the first position and the compartment in the second position;
- the thermal management system wherein the container includes at least one door covering a port formed on the wall of the container, wherein the interface is configured to open the at least one door in the first position;
- the thermal management system, further includes an actuator configured to open or close a valve or to control hot or cold air between the heat exchange unit and the container in response to detection of the container being in the first position; and the thermal management system wherein the container is a thermally-insulated cooler.

According to a second aspect of the present disclosure, a thermal management system for a front trunk of a vehicle includes a heat exchange unit coupled with an interface in a compartment. A container is moveable between a first position and a second position. The container is configured to be in fluid communication with the heat exchange unit via the interface in the first position. The container is disconnected from the interface in the second position. At least one conduit extends between the heat exchange unit and the interface for supplying air to or withdrawing air from the container in the first position and the compartment in the second position.

Embodiments of the second aspect of the disclosure can include any one or a combination of the following features:
- the thermal management system includes a valve for controlling air flow through the at least one conduit and a controller in communication with the valve, the controller configured to actuate the valve in response to the container not meeting a target temperature set by a user; and
- the thermal management system includes a temperature sensor configured to measure the temperature of air withdrawn from the container, wherein the controller is configured to control the valve based on the temperature.

According to a third aspect of the present disclosure, a thermal management system for a vehicle includes a front trunk compartment of the vehicle. A heat exchange unit is connected with the front trunk compartment of the vehicle via an interface. A first conduit and a second conduit each extend between the heat exchange unit and the interface. The first conduit is configured to supply air in a first direction toward the compartment and the second conduit configured to draw air in a second direction away from the compartment. A container is moveable between a first position and a second position. The container engages the interface in the first position and is disengaged from the interface in the second position. At least one valve is disposed in the interface for providing or limiting fluid communication between at least one of the first conduit and the second conduit and the container in the first position.

Embodiments of the third aspect of the disclosure can include any one or a combination of the following features:

the thermal management system includes a sensor configured to detect the presence of the container in the first position, wherein the at least one valve is configured to open in response to the sensor detecting the first position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
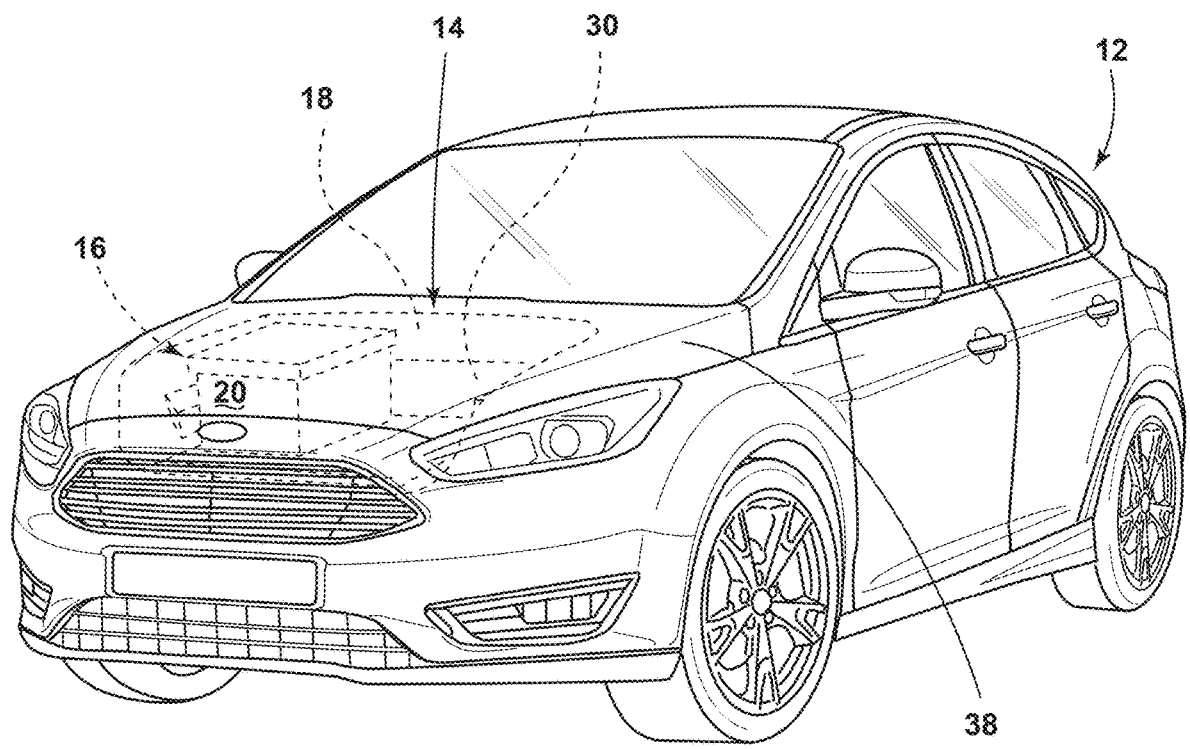
FIG. 1 is a perspective view of a vehicle incorporating a thermal management system of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a thermal management system for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In general, the present disclosure may provide for a climate-controlled environment for an interior space of a vehicle. The interior space may be a preformed cavity within the vehicle that is capable of housing a thermal structure, such as a cooler, and securing the thermal structure to a structure that defines the interior space (e.g., an outer wall of the cavity). The thermal structure, such as a box or a bag, may be permanently or temporarily secured with the outer wall or otherwise within the interior space, such that the thermal structure may be removable from the interior space or configured to be kept in the interior space. In examples in which the thermal structure may be removed from the interior space (e.g., a portable cooler), an environment of the interior space may be climate-controlled. In this way, environmental conditions of the interior space as a whole and/or environmental conditions of an expandable or removable thermal structure may be controlled.

Referring generally to the figures, the present disclosure provides for a thermal management system 10 for use in a vehicle 12. Although generally illustrated in the figures as being incorporated with a front trunk of the vehicle 12 (see, e.g., FIG. 1), it is contemplated that the thermal management system 10 of the present disclosure may be incorporated with any compartment of the vehicle 12 and is not limited to the front trunk of the vehicle 12. For example, the compartment 14 may be a passenger compartment, a trunk compartment, or any other interior space disposed in the vehicle 12. In general, the compartment 14 forms a thermally insulated space. A container 16 is provided to selectively couple with the compartment 14 and/or to move between a first position and a second position. In some examples, the container 16 is operable to move between an attached position and a released position, wherein in the attached position the container 16 is coupled to the wall 18, and in the released position the container 16 is decoupled from the wall 18 of the compartment 14.

Referring now to FIG. 1, the compartment 14 is exemplarily illustrated as a front trunk (e.g., "frunk") of the vehicle 12. As previously described, the compartment 14 described herein may be another compartment within the vehicle 12, such as a passenger compartment, a rear trunk compartment, or the like, including sub-compartments such as a center console or a dividing region between a front driver area and a front passenger area. The compartment 14 is configured to be in fluid communication with a heat exchange unit 22 (see FIGS. 2 and 3), such as a dual-box heat pump system. It is contemplated that the front trunk area of the vehicle 12 may be employed for use as the compartment 14 in order to take advantage of free space in the vehicle 12 at least partially resulting from the vehicle 12 being a battery electric vehicle (BEV) or another electric vehicle that allows for interior space in the front of the vehicle 12.

Figure 2:
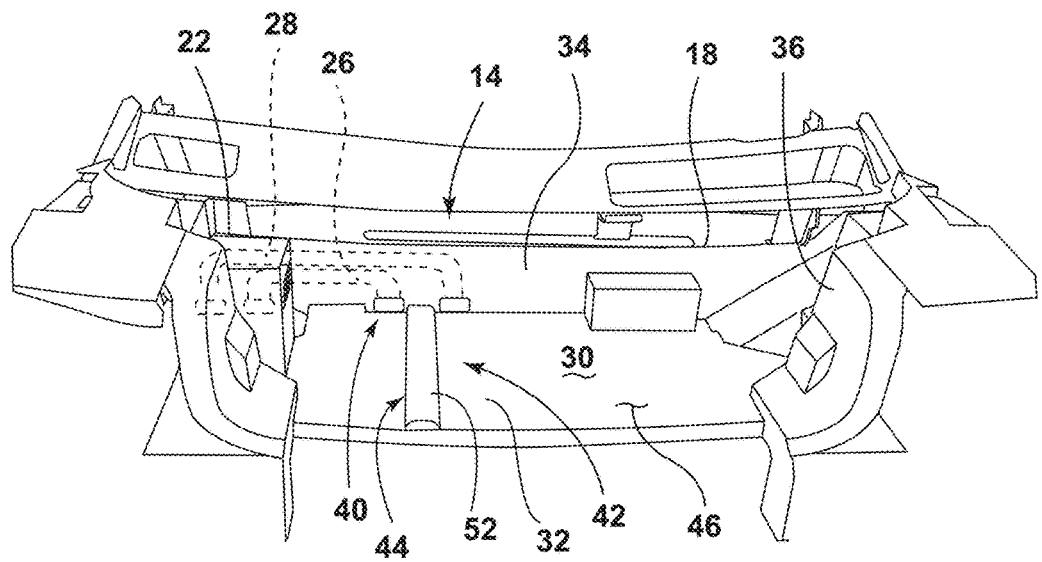
FIG. 2 is a frontal perspective view of a compartment of the vehicle with a container removed from the compartment.
Figure 3:
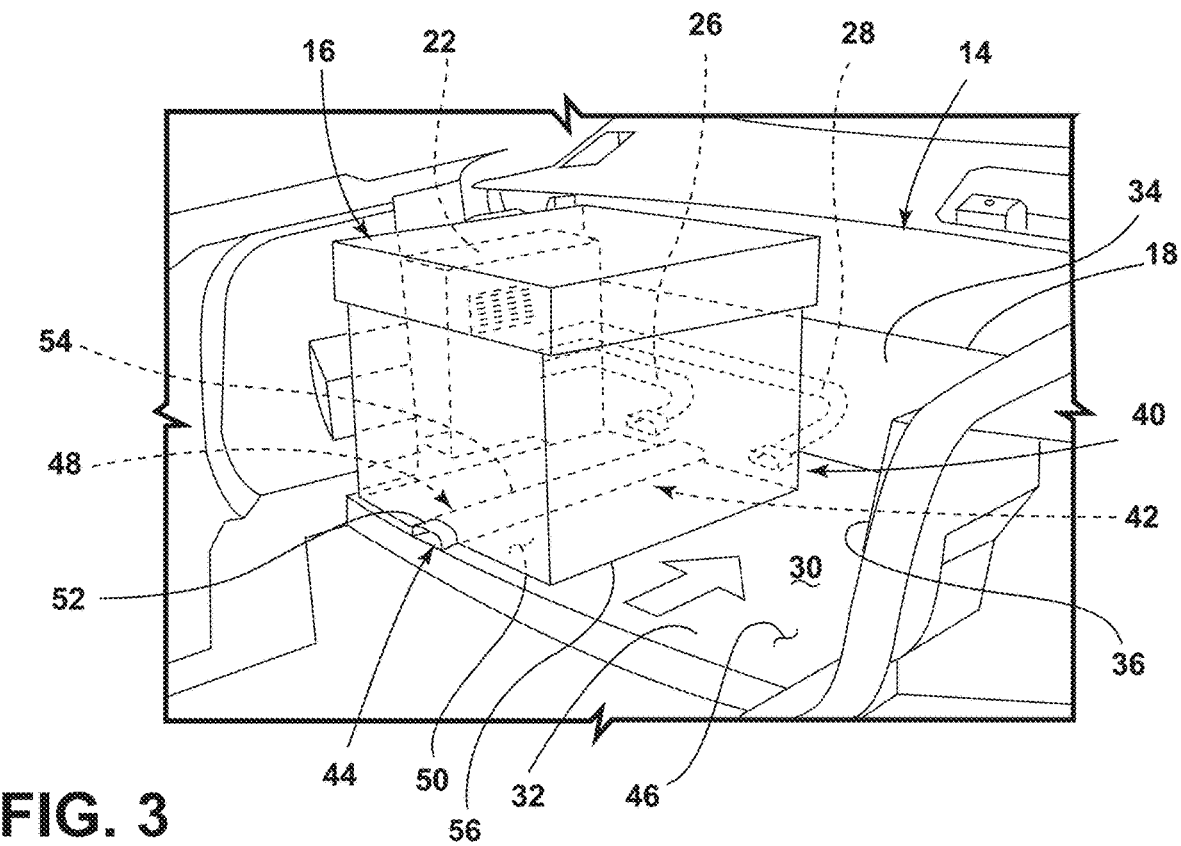
FIG. 3 is a perspective view of a container coupled with a compartment of the thermal management system according to one aspect of the present disclosure.

Referring now to FIGS. 2 and 3, the heat exchange unit 22 is illustrated as being disposed within or directly adjacent to the compartment 14, though it is contemplated that at least a portion of the heat exchange unit 22 may be disposed elsewhere within the vehicle 12. The heat exchange unit 22 described herein may be used to refer to a dedicated heat pump system as previously mentioned, or another subsystem of another heating or climate control system of the vehicle 12, such as an existing heating, ventilation, and air conditioning (HVAC) system of the vehicle 12. In the exemplary configuration, the heat exchange unit 22 is a dedicated dual-box heat pump system (e.g., a compact vehicle thermal management system (CVTMS)). In general, the CVTMS 22 can provide both hot and cold glycol coolant to be supplied and metered by dual valve units of a coolant loop. As will be described further in reference to FIG. 5, the heat exchange unit 22 may include a heat exchanger 24, a blower assembly, and other mechanics that allow for cooling and/or heating of a region of the vehicle 12. In general, the heat exchange unit 22 is configured to provide hot and/or cold air to the compartment 14 or the container 16. In some examples, the heat exchanger 24 includes evaporator or cooling coils, though any type of heat exchanger may be employed.

Referring now to FIG. 2, the hot and/or cold air is provided to the compartment 14 and/or the container 16 via a pair of conduits 26, 28 that extend between the heat exchange unit 22 and the wall 18 of the compartment 14. It is contemplated that the wall 18 may include any structure that defines a chamber 30 of the compartment 14, such as a floor 32, a back wall 34, a side wall 36, a ceiling (not pictured), a door 38 (FIG. 1), and the like. At the compartment 14, the first and second conduits 26, 28 form an interface 40 that provides for fluid communication between each 26, 28 and the compartment 14. In some examples, the first conduit 26 is configured to supply one of cool air or hot air to the compartment 14 or, as the case may be, the container 16, and the second conduit 28 is configured to draw the other of hot air or cool air from the compartment 14 or the container 16. For example, when the container 16 is coupled with the compartment 14, the pair of conduits 26, 28 may supply cool air and withdraw warm air from the space 20 within the compartment 14.

Referring now to FIGS. 2 and 3, an attachment arrangement 42 is disposed between the container 16 and the compartment 14 for securing the container 16 with the compartment 14. The attachment arrangement 42 includes a first mating member 44 disposed on an interior surface 46 of the compartment 14 and a second mating member 48 coupled with an exterior surface 50 of the container 16 for engaging the first mating member 44 in a first position of the container 16. For example, the first mating member 44 may be a track or guide 52 that protrudes upwardly from the floor 32 of the compartment 14, and the container 16 may define a groove 54 within a bottom wall 56 of the container 16 that is configured to mate with the guide 52. In the example illustrated, the container 16 is selectively attachable to the compartment 14 by sliding the female mating member 48 over the male member 44 in a direction toward the back wall 34 of the compartment 14.

In examples in which the container 16 is selectively received within the compartment 14, the container 16 is configured to be in fluid communication with the heat exchange unit 22 when the container 16 is in an engaged position with the wall 18 of the compartment 14. When the container 16 is disengaged from the compartment 14, the container 16 may be disconnected from the heat exchange unit 22. Accordingly, the thermal management system 10 of the present disclosure may monitor the position of the container 16 in the compartment 14 or the presence of the container 16 in the compartment 14 to control and/or allow for hot and/or cold air to be provided through the pair of conduits 26, 28. However, it is contemplated that the thermal management system 10 may be configured to provide hot and/or cold air to/from the compartment 14 when the container 16 is disengaged from the compartment 14 to heat or cool the compartment 14 generally. The compartment 14 may include thermal insulation about the walls 18 of the compartment 14 in order to facilitate thermal management of the compartment 14, though the container 16 may provide for a smaller operational volume in which thermal energy is more effectively preserved.

Figure 4:
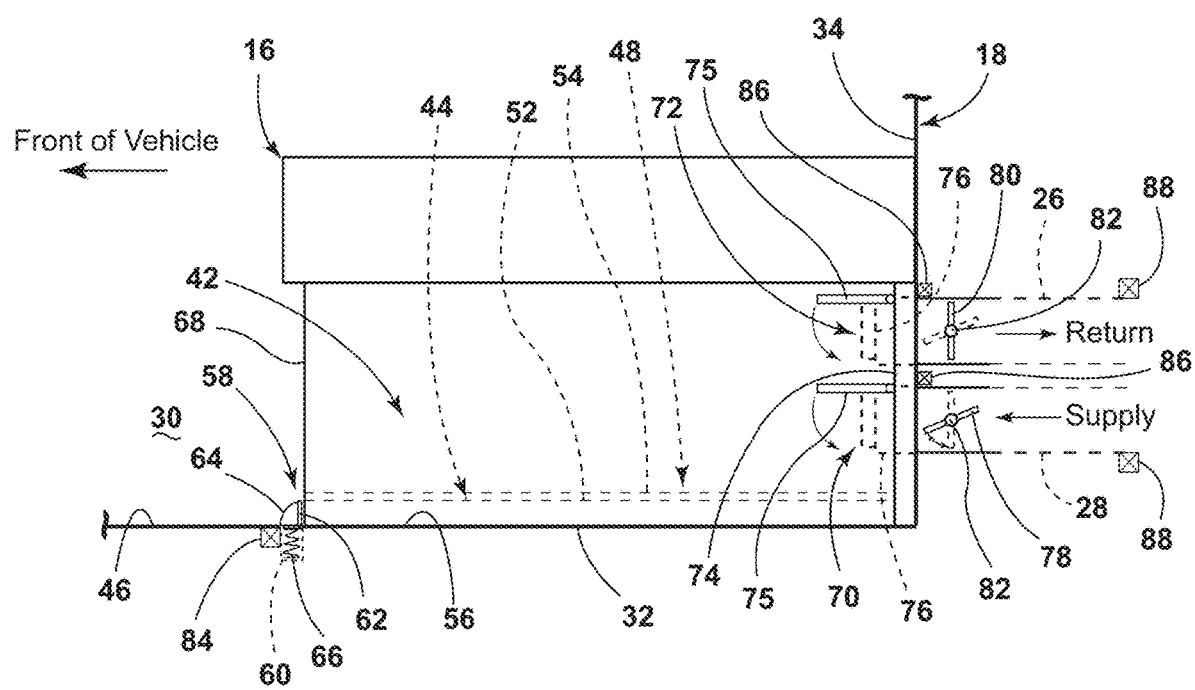
FIG. 4 is a side view of an arrangement of a container and a compartment of the present disclosure.

Referring now to FIG. 4, the attachment arrangement 42 is illustrated incorporating a locking member 58 that engages the container 16 along a front surface 68 of the container 16. The locking member 58 may be biased upwardly from the floor 32 of the compartment 14. Upon user manipulation (e.g., pushing down) of the locking member 58, the locking member 58 may retract into a notch 60 defined by the floor 32 of the compartment 14. The locking member 58 may include an engaging surface 62 along one side of the locking member 58 and a guiding surface 64 disposed along another side of the locking member 58 to allow the container 16 to be manipulated toward the back wall 34 of the compartment 14 but secured in a direction away from the back wall 34 in the engaged position. For example, the locking member 58 may include a biasing device 66, such as a spring, that is configured to bias the locking member 58 away from the notch 60 and therefore bias the container 16 toward the engaged position when the container 16 is in the engaged position.

When the container 16 is being moved from a released position to the engaged position, the container 16 may engage the guiding surface 64 of the locking member 58 to cause the locking member 58 to deflect toward or into the notch 60 to allow the container 16 to move toward the engaged position. Once in the engaged position, the front surface 68 of the container 16 engages the engaging surface 62 of the locking member 58 to secure the container 16 from movement away from the back wall 34. Although described as deflecting directly into (e.g., perpendicular to) the floor 32, the locking member 58 may additionally or alternatively be configured to deflect forward and downward, such that the notch 60 is elongated along the floor 32, and the biasing member is configured to bias the locking member 58 to rotate toward an upright position.

It is contemplated that the male mating member 48 (e.g., the guide 52) may secure the container 16 from lateral movement in a direction side to side relative to the back wall 34. It is further contemplated that the door 38 of the compartment 14 (FIG. 1) may cover a top portion of the compartment 14 in the closed position and may include an indentation or another holding mechanism that secures the container 16 from upward movement within the compartment 14. In some examples, the container 16 is substantially free from movement within the compartment 14 when the compartment 14 is closed and is substantially free from lateral or front to back movement when in the engaged position.

Still referring to FIG. 4, the container 16 may include an inlet port 70 and an outlet port 72 defined along a rear wall 74 of the container 16. The inlet and outlet ports 70, 72 may be selectively closed and opened via a pair of doors 75 that may be biased toward a closed position, or toward a position that encloses the space 20. The interface 40, which may protrude outwardly from the wall 18 of the compartment 14, may be aligned with the inlet port 70 and the outlet port 72 of the container 16 when the container 16 is in the engaged position. In addition, at least one alignment feature 76 may be disposed between the interface 40 and the inlet and outlet ports 70, 72 and correspond to each of the inner and outlet ports 70, 72. The alignment features 76 may concentrically or peripherally align the inlet and outlet ports 70, 72 with the interface 40. For example, the inlet and outlet ports 70, 72 may have a cross-section that is proportional to a cross-section to two ports of the interface 40, with the cross-sections of the two ports being slightly smaller than the cross-sections of the inlet and outlet ports 70, 72. This arrangement may allow a press fit connection between the interface 40 and the inlet and outlet ports 70, 72, though other connection arrangements that provide fluid communication between two objects are contemplated by the present disclosure. In some examples, the pair of doors 75 may be configured to deflect into the space 20 in response to the pushing the doors 75 into an open position when the interface 40 engages the inlet and outlet ports 70, 72. In this way, the container 16 may seal the space 20 when not in the engaged position but may be in fluid communication with the interface 40 when in the engaged position.

Still referring to FIG. 4, at least one valve 78, 80 may be provided with the interface 40 for controlling air to/from the container 16 and/or the compartment 14. The at least one valve 78, 80 may include a first valve 78 and the second valve 80, with the first valve 78 corresponding to the first conduit 26 and the second valve 80 corresponding to the second conduit 28. In general, the valves 78, 80 control fluid communication between the heat exchange unit 22 and the interface 40 and therefore, in some examples, the container 16 or the compartment 14. The valves 78, 80 may include actuators 82 (e.g., solenoid valves) that control opening or closing of the valves 78, 80 either between two states or between a plurality of partially open/closed states. In addition, or in the alternative, the solenoid is omitted and the valves 78, 80 are controlled by physical or mechanical manipulation. In this way, absent electrical control over the actuation devices, the heat exchange unit 22 may be selectively in fluid communication with the interior of the container 16 upon the container 16 being in the engaged position.

Referring still to FIG. 4, at least one position detector 84, 86 may be provided in the compartment 14 for monitoring a position of the container 16 or features related to the position of the container 16. The at least one position detector 84, 86 may be a limit switch, a proximity sensor, an infrared sensor, or the like configured to detect whether the container 16 is in the compartment 14 and/or to determine a position of the container 16 in the compartment 14. For example, a first position detector 84 may be provided adjacent to the notch 60 and/or be integrated with the locking mechanism 58 to monitor the state of the locking mechanism 58 and/or the biasing member (e.g., the spring 66). It is contemplated that in the engaged position, the engaging surface 62 of the locking member 58 may be slightly depressed, such that detection of the presence of the container 16 may be available by monitoring first position detector 84. Other electronic sensors may be provided and/or feedback sensors may be incorporated into the actuation units 82, such that feedback from the solenoid of the actuation unit 82 may be monitored in order to determine whether the container 16 is in the engaged position. For example, a second position detector 86 may be configured to monitor attachment of the inlet and outlet ports 70, 72 with the interface 40. Further, at least one temperature sensor 88 may be provided near the interface 40 and/or proximate to any portion of the first and second conduits 26, 28. In some examples, the at least one temperature sensor 88 includes a temperature sensor 88 for detecting the temperature of air returning from the container 16 of the compartment 14 to identify an associated temperature of the container 16.

Figure 5:
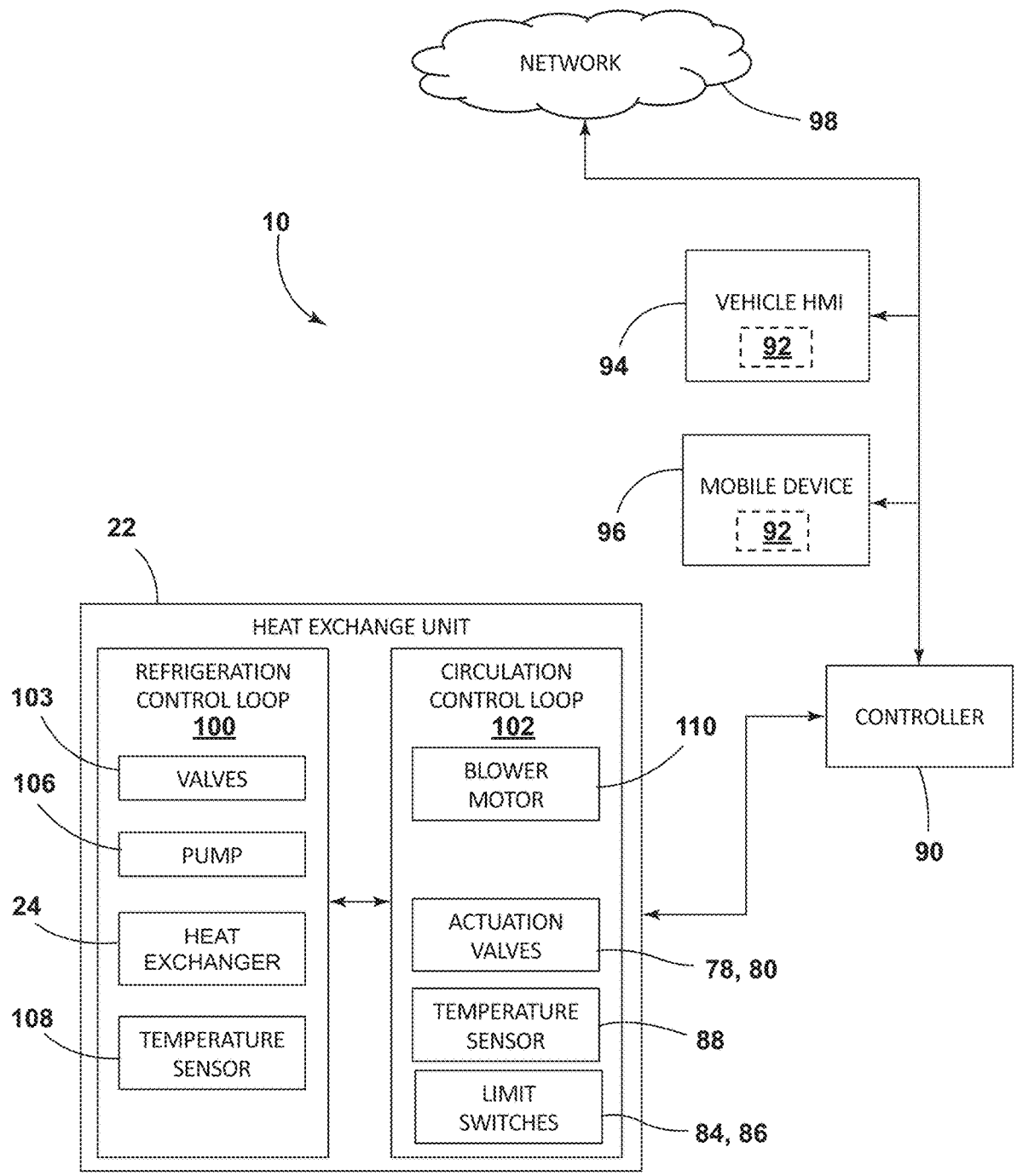
FIG. 5 is a block diagram of a thermal management system according to one aspect of the present disclosure.

Referring now to FIG. 5, the thermal management system 10 may include a controller 90 and at least one user interface 92 for interacting with the thermal management system 10. The at least one user interface 92 may be part of a vehicle human-machine interface (HMI) 94 and/or a mobile device 96 in communication with the controller 90 via a wireless or a wired network 98. For example, the interface 92 may be configured to display and receive user input related to control of, or monitoring of, the thermal management system 10 in a software application that may be operating on the network 98 (e.g., the Internet, a local network, etc.). In this way, a user may control the thermal management system 10 remotely from the vehicle 12 or adjacent to the vehicle 12.

Referring still to FIG. 5, the controller 90 may further be in communication with the heat exchange unit 22 and, more particularly may be in communication with various inputs and outputs associated with a refrigerant control loop 100 and an air control loop 102 of the heat exchange unit 22. For example, the controller 90 may be configured to control valving 103 associated with the refrigerant control loop 100, heat exchanger 24, a pump 106 for the refrigerant, and/or a thermocouple 108 for measuring a temperature associated with the refrigerant to provide hot or cold refrigerant to the air control loop 102 for heating or cooling the air. In some examples, the air control loop 102 includes a blower assembly which may include a blower motor 110, actuated doors (e.g., the valves 78, 80), the at least one temperature sensor 88, limit switches (e.g., the first and second position detectors 84, 86) and the like. The controller 90 may monitor a temperature associated with the container 16—for example, a temperature of an inlet duct (e.g., the first conduit 26), an outlet duct (e.g., the second conduit 28), and/or the interface 40—to determine or estimate the temperature of the compartment 14 and/or the container 16. Based on that detected temperature, the controller 90 may be configured to control the refrigerant control loop 100 to increase or decrease a heat level for the air in response to the detected temperature being above or below a target temperature for the container 16 or the compartment 14. In addition, the controller 90 may be configured to control the first and second actuators 82 to open or close fluid communication with the container 16 or the compartment 14 based on feedback associated with the air control loop 102.

In operation, the container 16 may be in a released position or in a retracted position and be moved from the released or retracted position into the engaged position by guiding the container 16 along the guide 52 until the locking member 58 locks the container 16 in the engaged position. The doors 38 of the container 16 may be configured to open in response to engaging the interface 40 of the container 16 via mechanical engagement with the alignment feature. The controller 90 may also communicate signals to the first and/or second actuators 82 to control the valves 78, 80 to open fully or partially once the container 16 is determined to be in the engaged position (via, e.g., the sensors and switches previously described). For example, the controller 90 may monitor the limit switch associated with the locking member 58 (e.g., the first position detector 84) and/or other sensors associated with the attachment arrangement 42 (e.g., the second position detector 86) to confirm or determine the position of the container 16. In addition, the controller 90 monitors thermal properties of the refrigerant and air control loops 100, 102 and, in response to user input to the user interface 92, controls the various valving and actuation mechanisms associated with the refrigerant control loop 100 and the air control loop 102 to heat or cool the container 16. When the container 16 is released or removed from the compartment 14, the actuation valves 78, 80 may be energized to open or close to provide fluid communication to the compartment 14 generally to heat or cool the compartment 14.

Climate control over the container 16 and/or the compartment 14 may be specific to a particular temperature or temperature range and/or a particular mode associated with humidity and/or a particular temperature range. For example, depending on the mode selected, a freezer mode (e.g., −10° F.), a refrigeration mode, (e.g., 35° F. to 45° F.), or a warming mode (e.g., 100° F. or more) may be selected by the user and the controller 90 may operate the valving 103 of the refrigerant control loop 100 and the actuators 82 of the air control loop 102 to heat or cool the air to attain the desired temperature. By providing for a temperature control region of the vehicle 12, the thermal management system 10 of the present disclosure may allow for the cooling and/or thermal management of food items and the like temporarily stored within the vehicle 12, such as lunches and the like, to limit spoilage and allow for users to travel with or store food items.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A thermal management system for a vehicle, the thermal management system comprising:
   a heat exchange unit coupled with a compartment of the vehicle via an interface in the compartment; and
   a container moveable between a first position and a second position, wherein the container is configured to be in fluid communication with the heat exchange unit via the interface in the first position, wherein the container includes at least one door covering a port formed on a wall of the container, and wherein the interface is configured to deflect the at least one door to an open position in the first position.

2. The thermal management system of claim 1, further comprising:
   an attachment arrangement including a lock biasing the container toward the first position when the container is in the first position.

3. The thermal management system of claim 2, wherein the attachment arrangement further includes a guide coupled with a wall of the compartment and a groove defined by an exterior surface of the container for engaging the guide in the first position.

4. The thermal management system of claim 3, wherein the guide extends from a floor of the compartment and the groove extends into a lower portion of the container.

5. The thermal management system of claim 1, further comprising:
   at least one conduit extending between the heat exchange unit and the interface for supplying air to or withdrawing air from the container in the first position and the compartment in the second position.

6. The thermal management system of claim 5, wherein the at least one conduit includes a first conduit for supplying air to and a second conduit for withdrawing air from at least one of the container and the compartment.

7. The thermal management system of claim 1, further comprising:
a valve for selectively providing the fluid communication between the heat exchange unit and the container.

8. The thermal management system of claim 7, further comprising:
a user interface and a controller, the controller being in communication with the valve and the user interface and configured to control the valve based on a user input to the interface.

9. The thermal management system of claim 1, wherein the container is engaged with the compartment in the first position and released from the compartment in the second position.

10. The thermal management system of claim 1, wherein the compartment is a front trunk of the vehicle.

11. The thermal management system of claim 1, wherein the heat exchange unit is configured to heat and cool the container in the first position and the compartment in the second position.

12. The thermal management system of claim 1, further comprising:
an actuator configured to open or close a valve to control hot or cold air between the heat exchange unit and the container in response to detection of the container being in the first position.

13. The thermal management system of claim 1, wherein the container is a thermally-insulated cooler.

14. A thermal management system for a front trunk of a vehicle, the thermal management system comprising:
a heat exchange unit coupled with an interface in the front trunk;
a container moveable between a first position and a second position, wherein the container is configured to be in fluid communication with the heat exchange unit via the interface in the first position and wherein the container is disconnected from the interface in the second position, wherein the container includes at least one door covering a port formed on a wall of the container, and wherein the interface is configured to deflect the at least one door to an open position in the first position;
at least one conduit extending between the heat exchange unit and the interface for supplying air to or withdrawing air from the container in the first position and the front trunk in the second position;
at least one valve for controlling air flow through the at least one conduit; and
a controller configured to close the at least one valve in response to the second position.

15. The thermal management system of claim 14, wherein the controller is configured to actuate the valve in response to the container not meeting a target temperature set by a user.

16. The thermal management system of claim 15, further comprising:
a temperature sensor configured to measure the temperature of air withdrawn from the container, wherein the controller is configured to control the valve based on the temperature.

17. A thermal management system for a vehicle, the thermal management system comprising:
a front trunk compartment of the vehicle;
a heat exchange unit connected with the front trunk compartment of the vehicle via an interface;
a first conduit and a second conduit each extending between the heat exchange unit and the interface, the first conduit configured to supply air in a first direction toward the compartment and the second conduit configured to draw air in a second direction away from the front trunk compartment;
a container moveable between a first position and a second position, wherein the container engages the interface in the first position and is disengaged from the interface in the second position;
at least one valve disposed in the interface for providing or limiting fluid communication between at least one of the first conduit and the second conduit and the container in the first position; and
a sensor configured to detect the presence of the container in the first position, wherein the at least one valve is configured to open in response to the sensor detecting the first position.

18. The thermal management system of claim 14, further comprising:
a position sensor configured to detect the presence of the container in the first position, wherein the at least one valve is configured to open in response to the position sensor detecting the first position.

* * * * *